United States Patent
Hunt (12)

(10) Patent No.: US 6,587,611 B1
(45) Date of Patent: Jul. 1, 2003

(54) MAINTAINING PATH INTEGRITY IN AN OPTICAL SWITCH

(75) Inventor: Peter Hunt, Scotts Valley, CA (US)

(73) Assignee: Calient Networks, Inc., San Jose, CA (US)

(*) Notice: Subject to any disclaimer, the term of this patent is extended or adjusted under 35 U.S.C. 154(b) by 0 days.

(21) Appl. No.: 09/588,773

(22) Filed: Jun. 6, 2000

(51) Int. Cl.[7] .................................................. G02B 6/26
(52) U.S. Cl. ............................. 385/18; 385/16; 385/17; 385/20
(58) Field of Search ............................. 385/16, 17, 18, 385/20, 22, 23

(56) References Cited

U.S. PATENT DOCUMENTS

| | | |
|---|---|---|
| 2,982,859 A | 5/1961 | Steinbrechner |
| 3,492,484 A | 1/1970 | Iti |
| 4,274,712 A | 6/1981 | Sintes |
| 4,365,863 A | 12/1982 | Broussaud |
| 4,421,381 A | 12/1983 | Ueda et al. |
| 4,574,191 A | 3/1986 | Conrad |
| 4,614,868 A | 9/1986 | Alster |

(List continued on next page.)

FOREIGN PATENT DOCUMENTS

| | | |
|---|---|---|
| DE | 19757181 A1 | 7/1999 |
| EP | 0 834759 A2 | 4/1998 |
| EP | 0 980014 A1 | 2/2000 |
| EP | 1 120677 A2 | 8/2001 |
| EP | 1 120989 A1 | 8/2001 |
| GB | 2 175 705 A | 12/1986 |
| GB | 2 239 101 A | 6/1991 |
| GB | 2 275 787 A | 9/1994 |
| GB | 2 328 312 A | 2/1999 |
| JP | 60-107017 | 6/1985 |
| JP | 5-107485 A | 4/1993 |
| JP | 6-180428 | 6/1994 |
| WO | WO 99/66354 | 12/1999 |
| WO | WO 99/67666 | 12/1999 |
| WO | WO 00/20899 A2 | 4/2000 |
| WO | WO 01/33898 A2 | 5/2001 |
| WO | WO 01/39413 A2 | 5/2001 |
| WO | WO 01/95009 A2 | 12/2001 |
| WO | WO 01/95010 A2 | 12/2001 |
| WO | WO 01/95011 A2 | 12/2001 |
| WO | WO 01/95013 A2 | 12/2001 |

OTHER PUBLICATIONS

Janusz Bryzek, Kurt Petersen, & Wendell McCulley, "Micromachines on the March," IEEE Spectrum, pp. 20–31 (May 1994).

(List continued on next page.)

*Primary Examiner*—Akm E. Ullah
*Assistant Examiner*—Jennifer Doan
(74) *Attorney, Agent, or Firm*—Blakely, Sokoloff, Taylor & Zafman LLP (57) ABSTRACT

A method for ensuring path integrity in an optical switch is provided that essentially eliminates any occurrences of misconnected paths and enables new signal paths to be easily generated and existing paths to be switched. The method is suitable for use in optical switching devices that enable selective connection of optical signals received on a plurality of input fibers to respective output fibers, wherein the optical switching device includes a first array of mirrors disposed in a first mirror plane and a second array of mirrors disposed in a second mirror plane. In accordance with the method, all mirrors are maintained in signal paths so that undesired light is prevented from reaching any of the output fibers.

28 Claims, 8 Drawing Sheets

U.S. PATENT DOCUMENTS

| | | |
|---|---|---|
| 4,626,066 A | 12/1986 | Levinson |
| 4,677,290 A | 6/1987 | Mitch |
| 4,696,062 A | 9/1987 | LaBudde |
| 4,746,195 A | 5/1988 | Auracher et al. |
| 4,758,061 A | 7/1988 | Horn |
| 4,823,402 A | 4/1989 | Brooks |
| 4,838,631 A | 6/1989 | Chande et al. |
| 4,838,637 A | 6/1989 | Torok et al. |
| 4,859,012 A | 8/1989 | Cohn |
| 4,892,388 A | 1/1990 | Taylor |
| 4,981,335 A | 1/1991 | Gaebe |
| 5,077,622 A | 12/1991 | Lynch |
| 5,077,815 A | 12/1991 | Yoshizawa et al. |
| 5,097,354 A | 3/1992 | Goto |
| 5,172,262 A | 12/1992 | Hornbeck |
| 5,177,348 A | 1/1993 | Laor |
| 5,383,118 A | 1/1995 | Nguyen |
| 5,440,654 A | 8/1995 | Lambert, Jr. |
| 5,450,512 A | 9/1995 | Asakura |
| 5,471,332 A | 11/1995 | Shiragaki et al. |
| 5,524,153 A | 6/1996 | Laor |
| 5,546,484 A | 8/1996 | Fling et al. |
| 5,555,558 A | 9/1996 | Laughlin |
| 5,568,575 A | 10/1996 | Sato |
| 5,600,739 A | 2/1997 | Anderson et al. |
| 5,621,829 A | 4/1997 | Ford |
| 5,623,337 A | 4/1997 | Iori et al. |
| 5,627,669 A | 5/1997 | Orino et al. |
| 5,629,790 A | 5/1997 | Neukermans et al. |
| 5,648,618 A | 7/1997 | Neukermans et al. |
| 5,671,304 A | 9/1997 | Duguay |
| 5,673,139 A | 9/1997 | Johnson |
| 5,726,815 A | 3/1998 | Gunter et al. |
| 5,832,415 A | 11/1998 | Wilkening et al. |
| 5,867,297 A | 2/1999 | Kiang et al. |
| 5,907,425 A | 5/1999 | Dickensheets et al. |
| 5,912,608 A | 6/1999 | Asada |
| 5,914,207 A | 6/1999 | Nishiki et al. |
| 5,920,417 A | 7/1999 | Johnson |
| 5,960,132 A | 9/1999 | Lin |
| 5,963,682 A | 10/1999 | Dorschner et al. |
| 5,982,554 A | 11/1999 | Goldstein et al. |
| 6,002,818 A | 12/1999 | Fatehi et al. |
| 6,031,656 A | 2/2000 | Little et al. |
| 6,049,412 A | 4/2000 | Bergmann et al. |
| 6,057,921 A | 5/2000 | Yao |
| 6,061,369 A | 5/2000 | Conradi |
| 6,075,639 A | 6/2000 | Kino et al. |
| 6,097,858 A | 8/2000 | Laor |
| 6,097,859 A * | 8/2000 | Solgaard et al. ............... 385/17 |
| 6,097,860 A | 8/2000 | Laor |
| 6,101,299 A | 8/2000 | Laor |
| 6,125,335 A | 9/2000 | Simon et al. |
| 6,127,679 A | 10/2000 | Ashley et al. |
| 6,137,926 A | 10/2000 | Maynard |
| 6,183,918 B1 | 2/2001 | Nishiki |
| 6,201,622 B1 | 3/2001 | Lobbett et al. |
| 6,208,469 B1 | 3/2001 | Matsuura |
| 6,208,784 B1 | 3/2001 | Glen et al. |
| 6,222,679 B1 | 4/2001 | Nevis |
| 6,236,481 B1 | 5/2001 | Laor |
| 6,245,590 B1 | 6/2001 | Wine et al. |
| 6,249,626 B1 | 6/2001 | Bergmann |
| 6,253,001 B1 | 6/2001 | Hoen |
| 6,253,010 B1 | 6/2001 | Belser et al. |
| 6,256,430 B1 * | 7/2001 | Jin et al. ...................... 385/18 |
| 6,262,827 B1 | 7/2001 | Ueda et al. |
| 6,289,145 B1 * | 9/2001 | Solgaard et al. ............... 385/17 |
| 6,295,154 B1 | 9/2001 | Laor et al. |
| 6,317,530 B1 | 11/2001 | Ford |
| 6,320,993 B1 | 11/2001 | Laor |
| 6,320,998 B1 * | 11/2001 | Okayama et al. ............. 385/22 |
| 6,327,398 B1 | 12/2001 | Solgaard et al. |
| 6,330,102 B1 | 12/2001 | Daneman et al. |
| 6,347,167 B1 | 2/2002 | Hagelin |

OTHER PUBLICATIONS

"Lucent's New All–Optical Router Uses Bell Labs Microscopic Mirrors," Bells Labs press release, pp. 1–4, Nov. 10, 1999. http://www.bell–labs.com/news/1999/november/10/1/html.

M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79 (Sep. 1999).

Ming C. Wu, "MEMS for Optical and RF Applications." UCLA Extension, Department of Engineering, Information Systems and Technical Management, Engineering: 823.52, Nov. 1–3, 1999.

M.C. Wu, L.–Y Lin, S.–S. Lee, and K.S.J. Pister, "Micromachined Free–Spaced Integrated Micro–Optics," Sensors and Actuators A, 50, pp. 127–134 (1995).

D.T. Neilson, V.A. Aksyuk, S. Arney, N.R. Basavanhally, K.S. Bhalla, D.J. Bishop, B.A. Boie, C.A. Bolle, J.V. Gates, A.M. Gottleib, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112×112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

Lih Y. Lin and Evan L. Goldstein, "Micro–Electro–Mechanical Systems (MEMs) for WDM Optical–Crossconnect Networks," IEEE, pp. 954–957 (1999).

Lau, K. Y. "MEM'S The Word For Optical Beam Manipulation", XP000831634, IEEE Circuits and Devices Magazine, vol. 13, No. 4, pp. 11–18 Jul. 1997.

* cited by examiner

MAINTAINING PATH INTEGRITY IN AN OPTICAL SWITCH

FIELD OF THE INVENTION

The present invention generally pertains to the field of optical switching and fiber optics, and relates to optical switching devices and fiber optic components. More particularly, the present invention relates to methods for ensuring path integrity in fiber optic switch arrays.

BACKGROUND OF THE INVENTION

Figure 1:
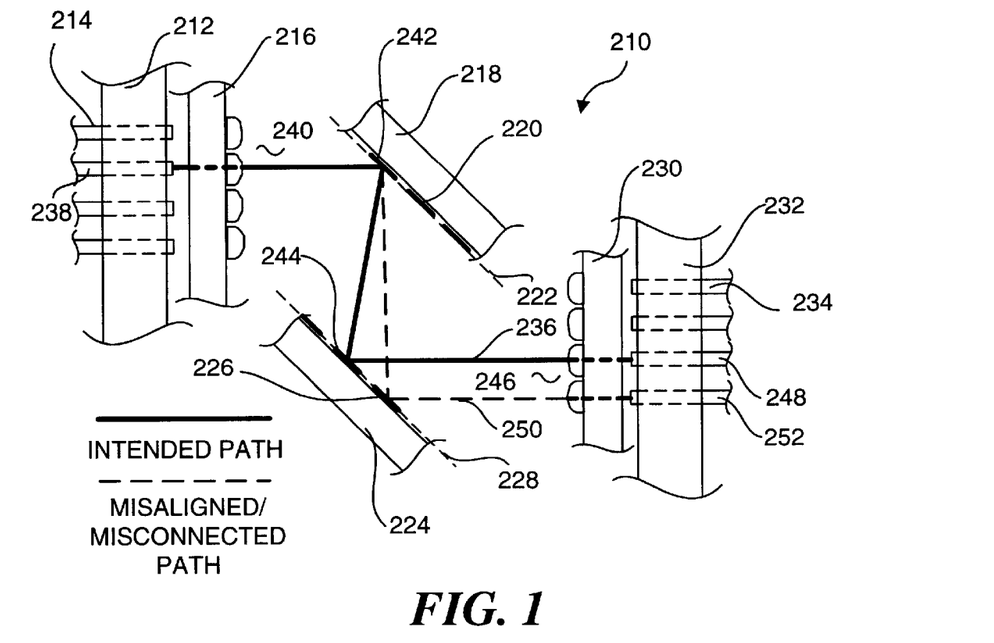
FIG. 1 is a schematic diagram illustrating an example of a misconnected path that may occur when using an optical switching device.

An optical switching device couples light beams from an input fiber to a selected output fiber. With reference to FIG. 1, one such optical switching device 210 includes an input receptacle 212 for receiving a plurality of input fibers 214, a first lens array 216, a first array of mirrors 218 comprising a plurality of mirrors 220 disposed in a first mirror plane 222, a second array of mirrors 224 comprising a plurality of mirrors 226 disposed in a second mirror plane 228, a second lens array 230, and a output receptacle 232 for receiving a plurality of output fibers 234. Mirrors 220 and 226 are placed and controlled in pairs so that light from a given incoming fiber can be directed toward any one outgoing fiber. An optical connection (i.e., completed signal path) is made when a mirror in first mirror plane 222, illuminated by an input fiber 214, directs light toward a mirror in second mirror plane 228, which directs this light toward a selected output fiber 234.

For example, one such signal path is illustrated by a path 236 shown in the Figure. Light output from an input fiber 238 passes through a lens 240 in first lens array 216 and is directed towards a mirror 242 in first mirror plane 222, whereupon it is reflected toward a mirror 244 in second mirror plane 228, which is positioned so as to direct the reflected light toward a lens 246 in second lens array 230, which in turn directs the light toward an output fiber 248.

Signal path 236 illustrates a desired connection path. However, due to various system anomalies, the position of either or both of mirrors 242 or 244 may move, as well as the alignment of other system components, thereby causing a system misalignment, creating a misconnected path, such as a path 250 depicted in the Figure, wherein light received from input fiber 238 is directed toward an output fiber 252 instead of the desired output fiber 248.

It is desired to avoid such misconnected paths. It is also desired to be able to switch any input fiber with any output fiber to form new connection paths, which requires correct positioning of the mirrors in the new desired connection path. In the prior art, one method for determining whether the mirrors in a connection path are properly positioned is to employ a set of sensors (e.g., strain gages) for each mirror, whereby the position of the mirrors are monitored relative to a frame of reference, and mirrors are positioned based on sensor feedback information. This technique is undesirable, as it requires extra components (e.g., the strain gages and associated signal processing circuitry) that must also be calibrated and may fail, and increases the size and complexity of the optical switching device. Accordingly, it is desired to provide a scheme for positioning the mirrors within an optical switching device such that misconnected paths are avoided without requiring additional components, and selected input fibers may be readily connected to new output fibers to form new signal paths.

SUMMARY OF THE INVENTION

A method of positioning movable mirrors so as to maintain signal path integrity in an optical switch is described. The method is suitable for use in optical switching devices that enable selective connection of optical signals received on a plurality of input fibers to respective output fibers, wherein the optical switching device includes a first array of mirrors substantially disposed in a first mirror plane and a second array of mirrors substantially disposed in a second mirror plane. In accord with the method, all mirrors are continuously maintained in signal paths, while setting up a single new path at a time. A mirror in the second mirror plane is moved into a correct position while controlling the position of other mirrors so as to prevent undesired light from being directed upon the mirror or toward an output fiber corresponding to the new signal path. A light signal is provided to an input fiber corresponding to the new signal path, and the light signal is directed toward a mirror in the first mirror plane. The mirror in the first mirror plane is moved to direct light toward the mirror in the second mirror plane. The new signal path is confirmed to be properly configured by observing a change in light intensity at the output fiber corresponding to the new signal path.

Other features and advantages of the present invention will be apparent from the accompanying drawings and from the detailed description that follows below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention addresses the foregoing limitations in the prior art by providing a method that essentially eliminates any occurrences of misconnected paths and enables new signal paths to be easily generated and existing paths to be switched. The method is suitable for use in optical switching devices that enable selective connection of optical signals received on a plurality of input fibers to respective output fibers, wherein the optical switching device includes a first array of mirrors substantially disposed in a first mirror plane and a second array of mirrors substantially disposed in a second mirror plane. The method also provides for optimization and verification of signal paths through measurements of output signals produced at selected output fibers.

Each signal path formation connects a signal received at an input fiber to a selected output fiber by appropriately configuring mirrors in the first and second mirror planes such that the signal received at the input fiber is directed toward a mirror in the first mirror plane, which in turn reflects the signal toward a mirror in the second mirror plane, whereupon the signal is directed by this mirror toward the selected output fiber to complete the signal path.

According to a first aspect, the method maintains path integrity by allowing only one new signal path to be connected at a time while preventing undesired signals from being produced at the output fiber corresponding to the new signal path. This is accomplished by continuously maintaining all mirror in signal paths through an appropriate positioning of the mirrors corresponding to those signal paths. While the mirrors are maintained in appropriate positions, a mirror in the second mirror plane is moved into a correct position in accord with the new signal path while controlling the position of other mirrors so as to prevent undesired light from being directed upon said mirror or toward an output fiber corresponding to the new signal path. For example, mirrors in proximity to the mirrors corresponding to the new path are maintained in the current positions. In addition, if the mirror in the second mirror plane was previously associated with a signal path, the mirror in the first mirror plane that was also associated with the signal path is moved to a "safe" position so that it no longer directs light toward the second plane mirror. A light signal (preferably a working signal, optionally a test signal) is provided to the input fiber that corresponds to the new signal path, which is directed toward a mirror in the first mirror plane. The new signal path is then confirmed to be properly configured by moving the mirror in the first mirror plane into correct position while observing a change in light intensity at the output fiber corresponding to the new signal path. Since the position of mirrors that could create an undesired signal are controlled to prevent such undesired signals from appearing at the output fiber, the new signal path can only be formed by the mirrors in the first and second mirror planes that are moved, i.e., the mirrors that correspond to the new path. In this manner, it is essentially impossible to have misconnected signal paths.

The method also provides for optimized mirror configuration to produce a maximal output signal. Generally, when a new signal path is to be formed, the first plane mirror corresponding to the signal path is already in an existing path. A light signal is requested prior to any mirror movement, and output power of this light signal is measured through the existing path at an output fiber corresponding to the path. During the optimization operation, a rapid hill climbing operation is performed, which comprises moving each of the mirrors in the signal path in a patterned movement to determine an optimized position, and then dithering the mirrors until maximal signal power is obtained. This maximal signal power is then compared with the signal power corresponding to the previous path to ensure that an optimized position has been obtained.

The method also provides for switching a pair of signal paths in an optical switching device, wherein a new pair of new signal paths are configured so that the input and output fibers of the original pair of signals are swapped. The configuration of each of the new signal paths is provided in accord with the signal path formation method discussed above, including verification and optimization of each of the signal paths.

Figure 2:
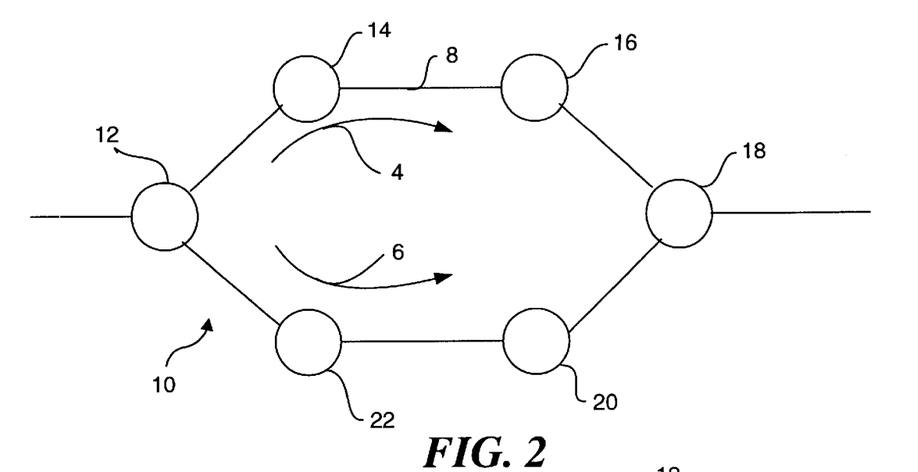
FIG. 2 shows an optical network with optical cross-connect switches.

FIG. 2 illustrates a fiber optic network 10 that employs optical cross-connect switches 12, 14, 16, 18, 20, and 22. The optical cross-connect switches 12, 14, 16, 18, 20, and 22 allow the optical network 10 to recover from failures relatively rapidly. For example, if the optical fiber line connecting switches 14 and 16 is accidentally severed, the data carried by optical signals through path 4 will not be able to make it to switch 18. In the event of such a failure, optical cross-connect switch 12 would redirect the optical path from path 4 to path 6, thereby avoiding the cut in the fiber line 8.

The optical fiber network 10 can carry digital data, voice signals, and video signals over fiber optic lines at various transmission speeds. For example, fiber optic network 10 can send digital information in an ATM format at Sonet speeds. Digital fiber optic network 10 can also send Internet and Intranet traffic. Digital fiber optic network 10 can, for example, use dense wave length division multiplexing ("DWDM") technology to transfer digital information at a very high capacity.

Figure 3A:
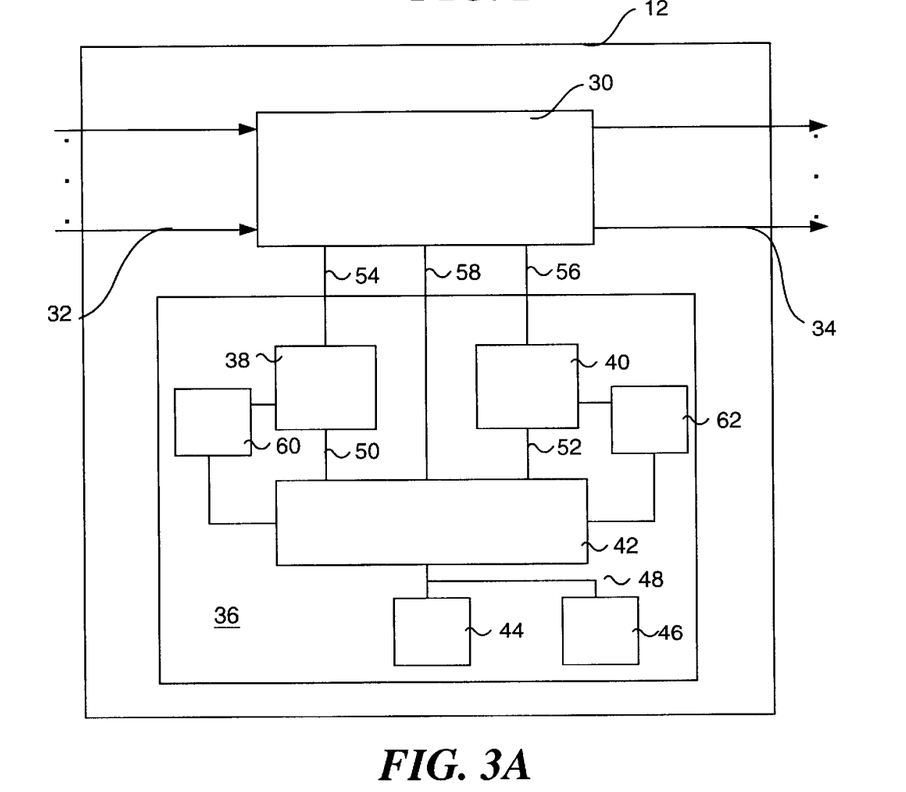
FIG. 3A is a block diagram of an optical cross-connect switch that may be used for implementing the present invention.

FIG. 3A is a block diagram of optical cross-connect switch 12. Switch 12 includes fiber and mirror array assemble 30, which is coupled to control circuitry 36. Fiber and mirror array assembly 30 is shown in more detail in FIG. 3B. Fiber and mirror array assembly 30 receives as inputs an array of fiber optic cables 32. In addition, an array 34 of fiber optic cables are provided as an output from fiber and mirror assembly 30.

Control circuitry 36 includes digital signal processors ("DSPs") 38 and 40. DSP 38 is coupled to fiber and mirror array assembly 30 via lines 54. For one embodiment of the invention, DSP 38 and 40 are each a TMS320C6211 fixed-point digital signal processor supplied by Texas Instruments of Dallas, Tex. Memory 60 is coupled to DSP 38. Memory 62 is coupled to DSP 40.

DSP 38 controls the positions of a first array 106 of MEMS gimbaled mirrors. DSP 40 controls the positions of a second array 108 of MEMS gimbaled mirrors. DSP 38 controls the voltages and currents sent to position the mirrors with the first mirror array 106. DSP 40 controls the voltages and currents used to position the mirrors of the second mirror array 108 found within fiber and mirror array assembly 30.

DSP 38 is able to generate a mathematical approximation of the relationship of optical power versus mirror or reflector position based on a set of optical power values received by DSP 38 for the first mirror array 106. DSP 38 is able to choose a position of the movable mirror or reflector of a mirror within the first mirror array 106 based on a point in the mathematical approximation of the relationship of optical power versus reflector position. DSP 38 is able to do this by running code stored within memory 60 and DSP 38.

Likewise, DSP 40 can generate a mathematical approximation of a relationship of optical power versus mirror or reflector position based on a set of optical power values with respect to a mirror within the second mirror array 108. Likewise, DSP 40 can choose a position of a movable mirror or reflector within the second mirror array 108 based on a point in the mathematical approximation of the relationship of optical power versus reflector position. DSP 40 runs code stored within DSP 40 and memory 62.

DSP 38 is able to run the mathematical approximation used to choose the optimal mirror position in parallel for all the mirrors within the first mirror array 106. Likewise, DSP 40 is able to generate the mathematical approximation for choosing the optimal mirror position in parallel for all the mirrors within the second mirror array 108.

Processor 42 is coupled to DSP 38 via lines 50 and to DSP 40 vial lines 52. Processor 42 is also coupled to fiber and mirror array assemble 30 via lines 58. Processor 42 is also coupled to volatile memory 44 and non-volatile memory 46 via bus 48 and memories 60 and 62.

Processor 42 oversees the operation of DSP 38 and DSP 40. Processor 42 oversees the operation of maintaining the optimal signal path through fiber and mirror assembly 30. Processor 42 runs code that ensures that the optimal mirror position is chosen in one mirror array for a particular light path before the optimal mirror position is chosen in the second mirror array in the same light path. In other words, processor 42 oversees the shifting of processing from DSP 38 to DSP 40 for a particular light path optimization procedure. As will be described below, one mirror in a light path is optimized before the second mirror in the light path is then optimized. Processor 42 allows the shifting of optimization from one mirror array to the other. It should be kept in mind, however, that the processing from the mirrors on a particular mirror array is done in parallel, so there is parallel global shifting between a first mirror and a second mirror array that is coordinated by processor 42.

Figure 3B:
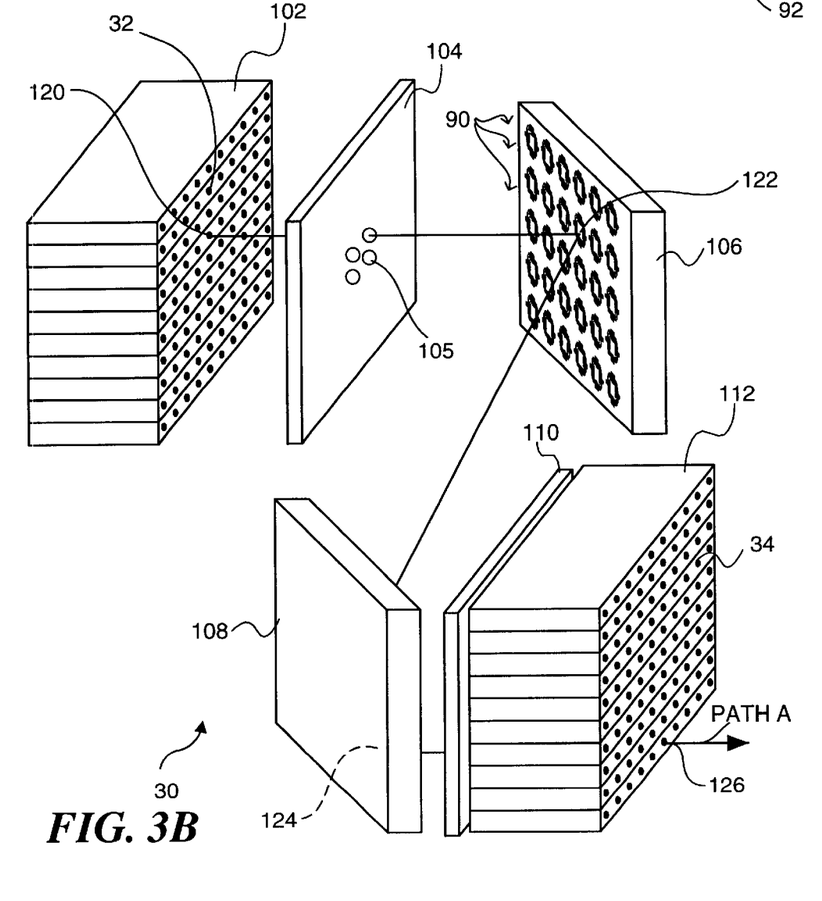
FIG. 3B is a schematic diagram illustrating the major components of the optical cross-connect switch of FIG. 3A.

FIG. 3B illustrates fiber and mirror array assembly 30. Fiber and mirror array assembly 30 includes input fibers 32, input fiber block 102, first lens array 104, first mirror assembly 106, second mirror assembly 108, output fiber block 112, second lens array 110, and output fibers 34.

Figure 3C:
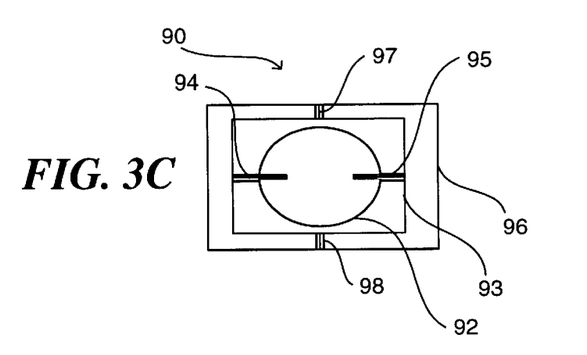
FIG. 3C is a diagram illustrating a MEMS gimbaled mirror device.

Input fiber block 102 includes a plurality of input optical fibers 32 for transmitting light to first lens array 104. First lens array 104 includes a plurality of optical lenses 105 that are used to direct collimated beams of light from input fiber block 102 to individual MEMs mirror devices 90 in first mirror array 106. A MEMS mirror device 90 is shown in FIG. 3C.

MEMS gimbaled mirror device 90 is also referred to as MEMs gimbaled mirror reflector 90. Gimbaled mirror device 90 includes a reflector or mirror 92 that is connected to a frame 93 via gimbals 94 and 95, both of which reside on the same axis. Frame 93 is in turn connected to an outer frame 96 via gimbals 97 and 98, which likewise reside on the same axis. The axis of gimbals 94 and 95 is substantially perpendicular to the axis of gimbals 97 and 98.

Gimbals 94 and 95 allow mirror or reflector 92 to rotate in a Y direction. Gimbals 97 and 98 allow frame 93 holding reflector 92 to rotate in the X direction. Thus, the gimbaled arrangement of MEMs device 90 allows the mirror 92 to direct light in X and Y directions. Parallel plate electrostatic actuators (not shown) provide the force for moving the gimbaled mirror 92 in both X and Y directions.

For alternative embodiments, MEMs mirror device 90 may be of different shapes and configurations. For example, the mirror component 92 may be circular, oval or rectangular.

First MEMS mirror array 106 may comprise an array of MEMS mirror device 90 that can pivot a mirror component to redirect or reflect light beams to varying MEMS mirror devices on second MEMS mirror array 108. Second MEMS mirror array 108 may also comprise a plurality of MEMS mirror devices 90, which are used to redirect and reflect light beams to varying lenses on second lens array 110. Second lens array 110 accepts collimated light beams from second MEMS mirror array 108 and focuses the light beams to individual output fibers 34 disposed within output fiber array 112.

Fiber and lens assembly 30 allows light beams from a given input fiber 32 to be redirected toward a selected output fiber 34 in output fiber array 112. For example, a light beam following a path A in the Figure is outputted from an input fiber 120 and is directed toward a MEMS mirror device 122 disposed on first MEMS mirror array 106. The light beam is then reflected away from MEMS mirror device 122 towards a MEMS mirror device 124 disposed on the backside of second MEMS mirror array 108. The light beam is then reflected away from MEMS mirror device 124 toward a lens in second lens array 110, which directs the light toward an output fiber 126. It is noted that the light beam can be redirected to another output fiber by adjusting the position of MEMS mirror device 122, which will cause the light beam to be directed toward a MEMS mirror device other than MEMS mirror device 124, wherein the position of the other MEMS mirror device will be adjusted to direct the light beam toward a corresponding output fiber. In this manner, fiber and lens assembly 30 is able to redirect optical signals on individual input fibers to selected output fibers. In addition, fiber and lens assembly 30 is able to handle a plurality of optical signals simultaneously.

Figure 4:
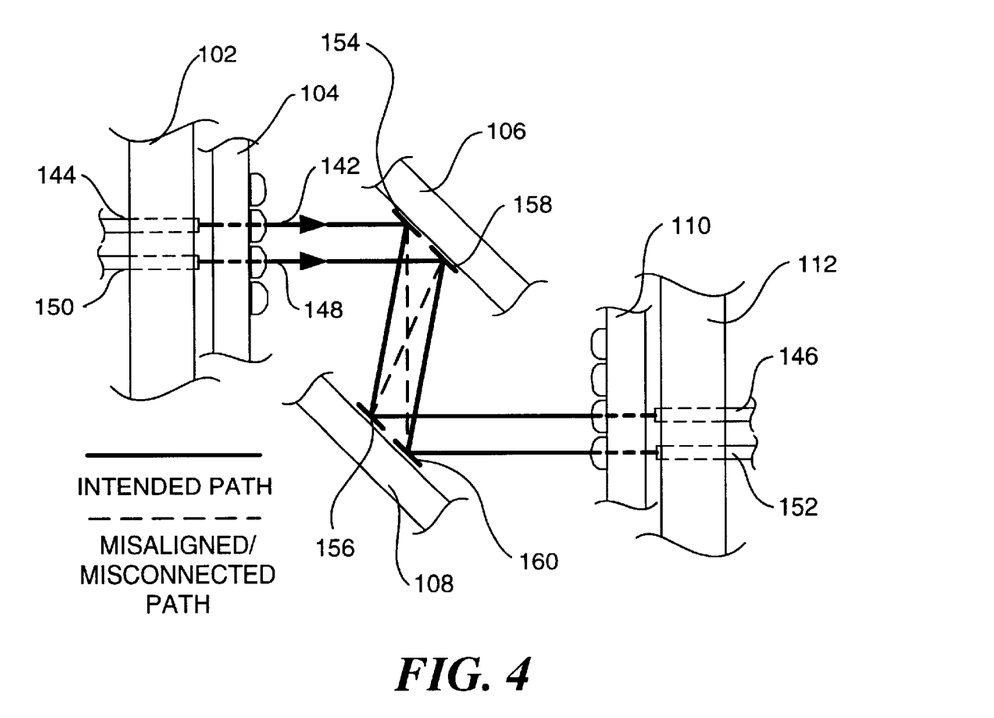
FIG. 4 is a schematic diagram illustrating an example of a misconnected pair of optical signal paths in accord with the optical switching system of FIG. 2.

As illustrated in FIG. 4 and discussed above, there may be instances where mirror misalignment causes one or more light beams to be directed along a misaligned or misconnected path. For instance, suppose that it is desired to connect a first signal 142 on an input fiber 144 with an output fiber 146, and a second signal 148 on an input fiber 150 with an output fiber 152. In order to connect first signal 142 in the desired manner, mirrors 154 and 156 must be in proper alignment. Similarly, in order to connect second signal 148 in the desired manner, mirrors 158 and 160 must be in proper alignment.

Now suppose that each of mirrors 154, 156, 158, and 160 are slightly misaligned such that input fiber 144 is connected to output fiber 152, and input fiber 150 is connected to output fiber 146. As a result, first and second signals 142 and 148 are crossed from their desired configuration. Such a result is undesirable, and may be caused for several reasons, including drift, a significant physical jolt or vibration, power failure, etc.

The present invention substantially eliminates the opportunity for such misconnections to occur through by implementing the following.

(1) All mirrors are continuously maintained in paths. No mirror is neglected.
(2) When a path is set up, only one connection is made at a time (amongst those mirrors where confusion is possible—i.e., those mirrors in close proximity). Furthermore, this connection is confirmed by the timing of a change in light intensity.
(3) Thereafter, each path is maintained in its optimum position. If "working light" is not available, a substitute test light is introduced.
(4) If, at any time, there is a possible chance of misconnection (after a significant physical jolt or vibration, power failure, etc.), then each mirror is placed in a path which is again confirmed by the timing of a change in light intensity.

(5) On top of all this, anomalies are investigated during path focussing, or "hill climbing," that could be due to such a misconnection.

Figure 5:
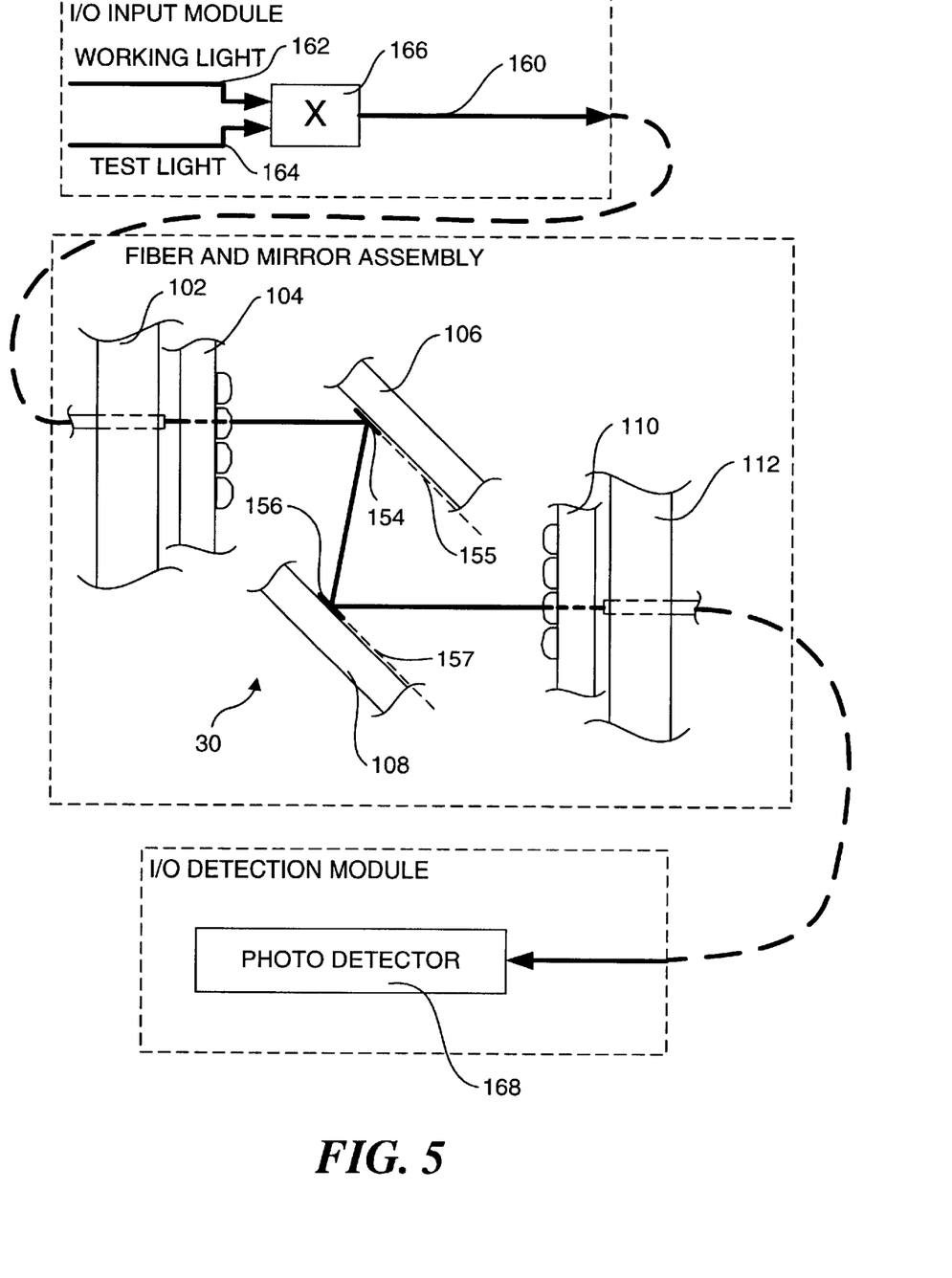
FIG. 5 is a block schematic diagram illustrating the major components of a system used during the path configuration process of the present invention.

A proper connection path is confirmed in the following manner, with reference to FIGS. 5 and 6. When a path is about to be formed, a mirror in the first mirror plane (i.e., a mirror disposed on first MEMS mirror array 106 in a first mirror plane 155 that directs light toward a mirror disposed on second MEMS mirror array 108, which is in a second mirror plane 157) is already in an existing path by the configuration of the system. In accord with a block 169 of FIG. 6, the output power of the optical signal through the existing path is measured through use of a light 160, preferably provided by a working light 162 if available, otherwise a test light 164 (through use of a switch 166), wherein the output power from this light is measured through the existing path by a photodetector 168 or an equivalent light-measuring device.

In order to establish a new path, a mirror in each of first and second mirror planes 155 and 157 must be moved though a predetermined sequence. As provided by respective blocks 170 and 172. The mirror in the second mirror plane that is to be part of the new path is moved into its correct position for the new path, while the mirror it was previously associated (the mirror in the first mirror plane) is moved to a safe place (i.e., "parked" in a designated location). The light received by this second plane mirror is then checked to verify it is dark, in accord with a block 174.

The logic next flows to a block 176, in which the first mirror is moved to direct light toward the second mirror, in a timed, controlled motion. The second mirror should see light appear at exactly the arrival time of the first mirror. This can be confirmed by examining the light signal on the signal path's corresponding input and output fibers. No other mirror that has potential for getting confused with these mirrors (neighbor mirrors, i.e., the mirrors in close proximity to the mirrors being adjusted) is allowed to move at the same time.

Next, the mirrors are adjusted to optimize the path using a "capture" operating in a block 178. In general, optical switch loss due to misalignment can occur in two places:

1. The pointing error of the mirror in the first plane. An accurately positioned first plane mirror directs light energy directly onto the second mirror in the path, whereas a mispositioned mirror results in some light missing the second mirror, leading to a decrease in signal power.
2. The pointing error of the mirror in the second plane. The second plane mirror's job is to direct the light onto an appropriate lens. Signal loss will increase as the body of the light beam moves off the lens axis, and as more light is directed outside the aperture of the lens.

Because the light path is large compared with the aperture of the mirrors and the lenses, these two effects are largely independent—sufficiently independent to allow the optimization of the two mirror positions separately.

Figure 7:
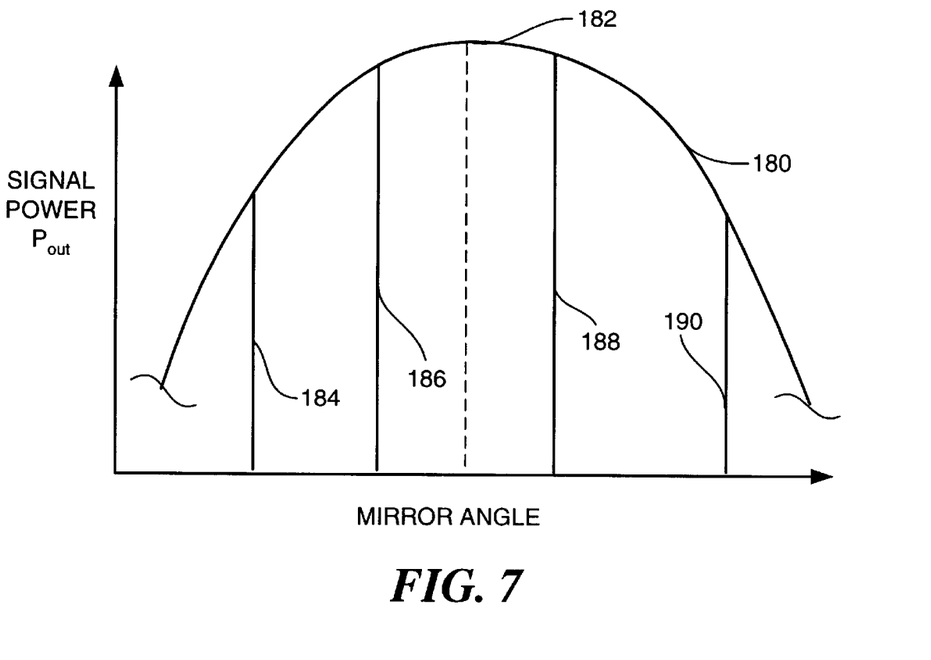
FIG. 7 is an X-Y graph illustrating a typical hill profile in accord with the variation of the signal power versus for mirror position that is used for optimizing the signal path.

A graph depicting signal power vs. mirror position is shown in FIG. 7. In general, the signal power curve for a given mirror position will typically have a gaussian-shaped distribution, similar to a signal power curve 180 depicted in the Figure. This profile is known as a "hill." It is noted that actual signal power curves may include one or more lobes, and/or may be asymmetrical in shape. As can be recognized from the graph, a small change in the position of one of the mirrors from an optimum position 182 (i.e., the peak of the "hill") will result in a small decrease in light output power. Therefore, each mirror position can be characterized by a 2D surface that shows the decrease in power as the mirror moves from the peak. This 2D surface corresponds to the mirror's signal power curve.

The optimization process starts by moving one of the mirrors in a pattern of small movements. Power measurements at each one of these positions in the pattern are used to calculate an estimate of the optimal position for the mirror, i.e., the position at which the signal should reach the peak of the hill. After a first mirror in a given path is optimized. The other mirror in the connection path is then optimized in a similar fashion.

The optimization process essentially comprises making small changes to the mirror positions, observing the changes in gain at these points, and calculating the optimum position. The process is known as "hill climbing." With reference to FIG. 8, signal power readings are taken with the mirror pointing sequentially to four positions (labeled 1–4) surrounding a start/end position in accord with the position of the mirror at the start and the end of the pattern. An optimum position is calculated on both axis from these readings, and the mirror is re-positioned. Both mirrors in a connection are processed alternately.

Preferably, the hill climbing process must assume that the peak power value (the goal of the hill climbing) is unknown, and that there is uncertainty in the shape of the beam (e.g., due to lobes and/or asymmetry). Although the positions in both the dither pattern above are instigated by changes in control voltage (or current etc.), they are scaled to be in the coordinate system of the target mirror plane, or in deflection angle of the mirrors (depending on the circumstances).

Figure 8:
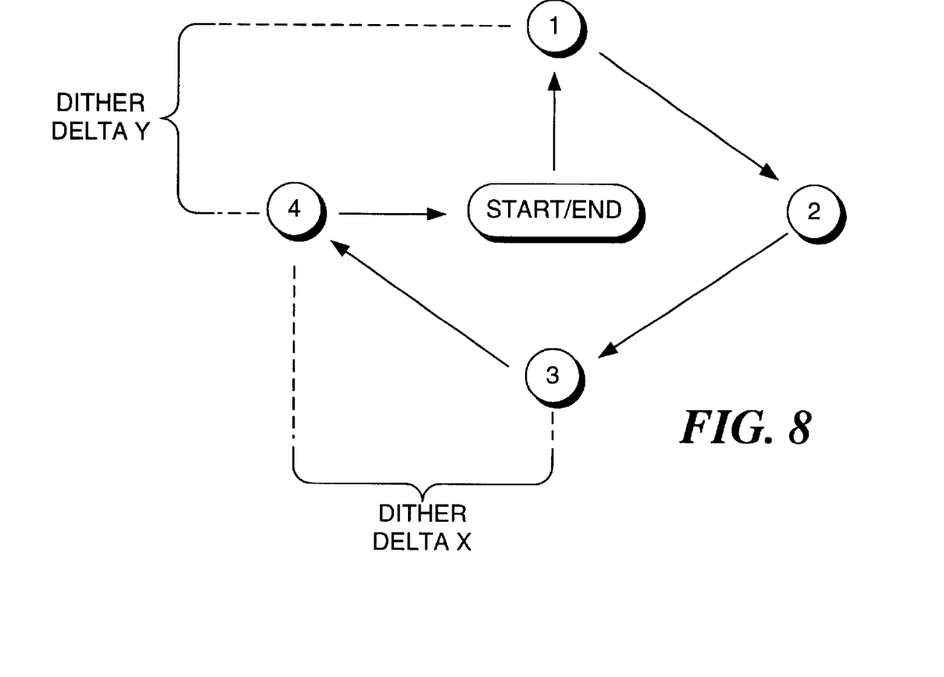
FIG. 8 is a block schematic diagram illustrating a positioning sequence that is traversed while optimizing the position of each of the mirrors during a capture operation.

Initially, when a path is first established, this operation uses large delta movements (in the order of half a mirror width) to make the hill climb as rapid as possible. Power readings are taken only once for each position. The signal power, $P_{out}$ at each position is recorded, such as signal power value corresponding to positions 184, 186, 188, and 190. The power value used in the calculation is actually the loss of the system, or $P_{out}/P_{in}$, to compensate for the slow variations in the input power (and the effects from other hill climbing activities upstream). The process predicts the position of beam peak, and estimates the peak value. Various approximations to the surface can be used (e.g., the surface may be modeled as having a gaussian, or quadrilateral profile.).

Once the peak has been found, further operations provide smaller and smaller corrections. At this point the dither deltas are slowly reduced, to reduce the impact on the signal, and to derive a better measure of the peak.

As the deltas are reduced, the changes in the measured signal become smaller, until signal noise becomes a significant factor. When this occurs, the single measurement of loss at each point is replaced by the collection of a large number of samples (e.g., this number could reach several thousand). This allows for very precise measurements of gain to be made, enabling very small dithers, which result in changes in system loss that are well below the noise level of the working light.

Figure 6:
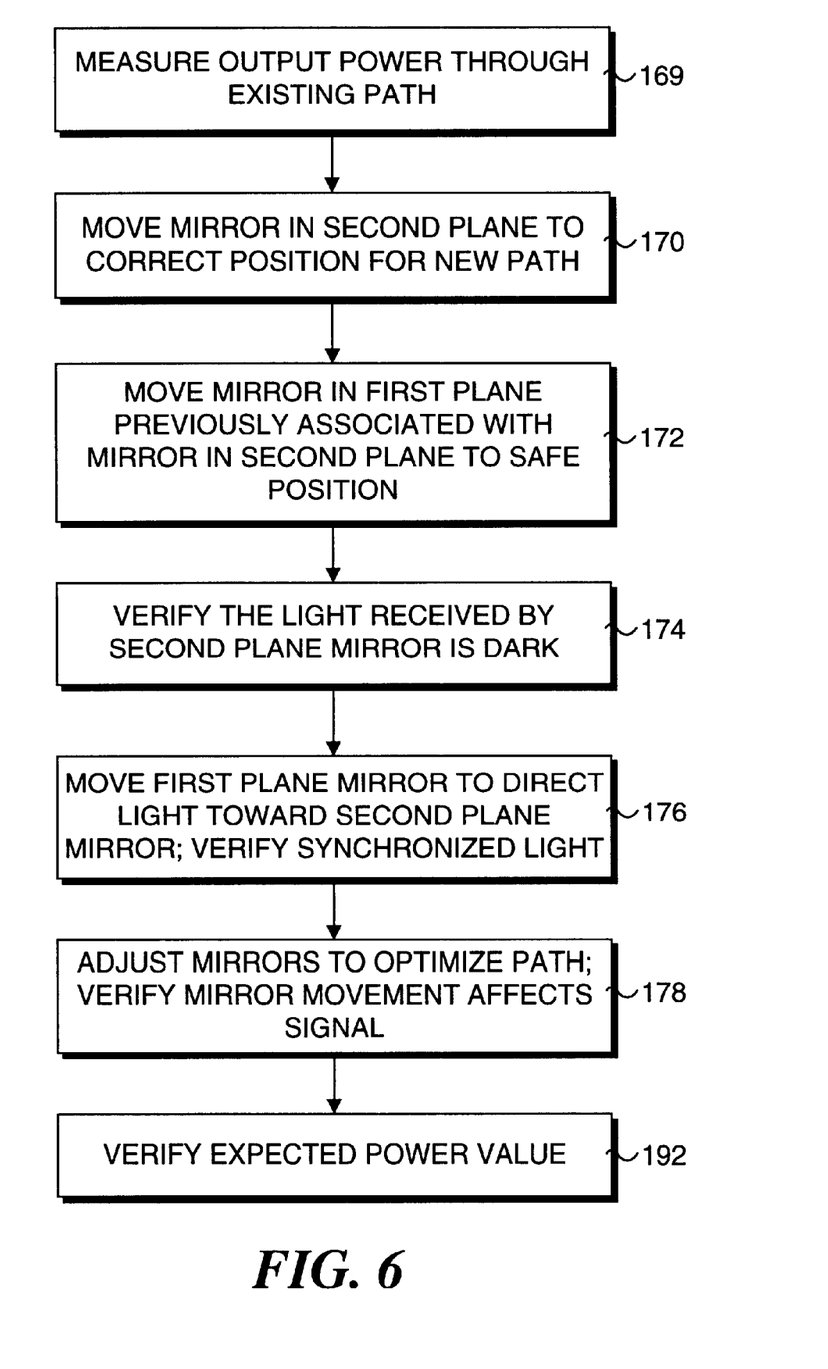
FIG. 6 is a flowchart for illustrating the process of creating a new path in accord with the present invention.

Returning to the flowchart of FIG. 6, in addition to the path optimization activities in block 178, confirmation is made that mirror movements do indeed affect the output light signal. Finally, after the path has been optimized, there is a further check on the expected power value, which should correspond to light intensity before the move, as provided by a block 192.

If at any time a connection is lost, and is regained after a search, then a deliberate, timed "wink" is made. The first mirror is moved away from its correct position, and the output light is examined to detect the light fluctuation. Only one mirror is allowed to do this activity at any one time.

Figure 9:
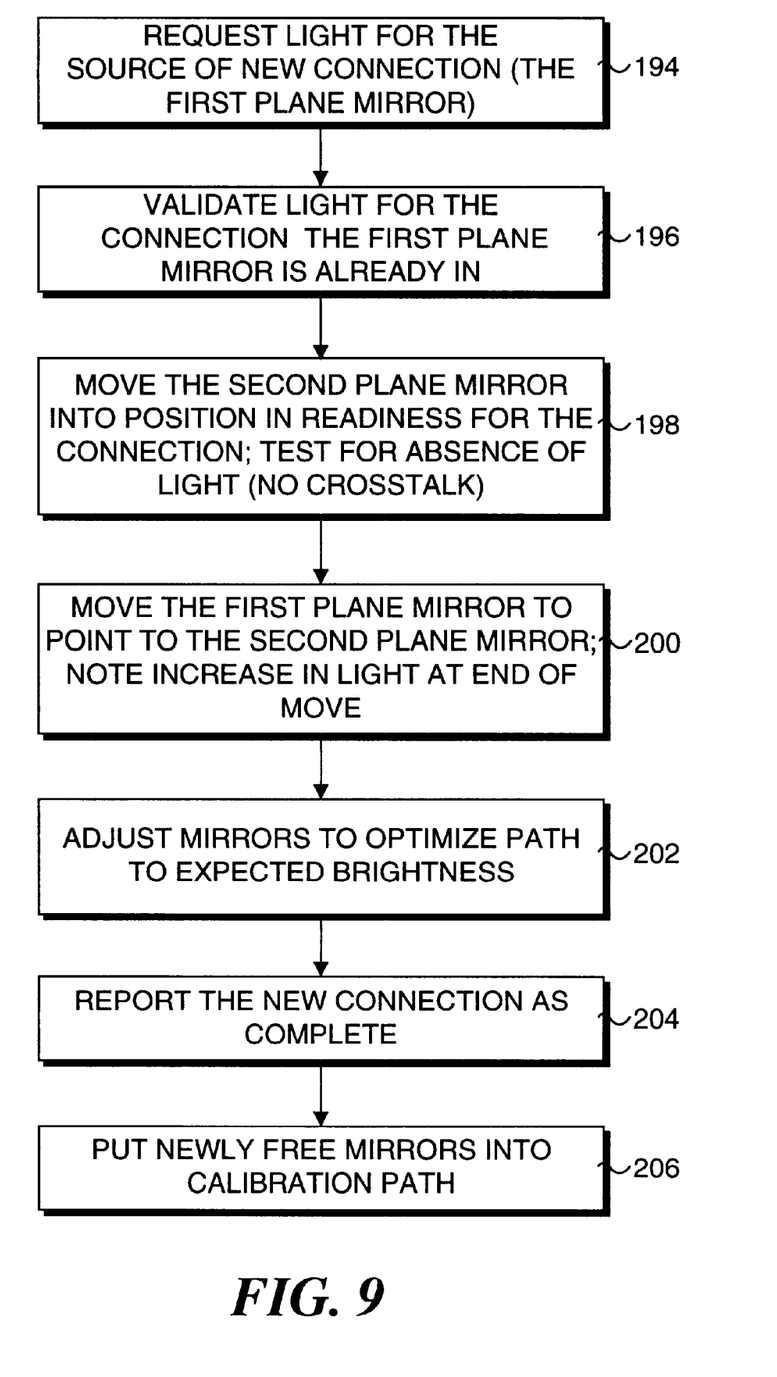
FIG. 9 is a flowchart for illustrating the process of swapping a pair of channels in accord with the present invention.

Moving a channel in a fully-configured optical switch requires a change in connectivity of four mirrors, resulting in the swapping of outputs for a pair of channels. With reference to FIG. 9, a move process begins in a block 194, wherein a light (working or test) is requested for the source of the new connection, i.e., the first plane mirror. To confirm its existence, and that the mirror is operating properly at this stage, the light for the connection to this first plane mirror is validated, as provided by a block 196. The second plane mirror is then moved into position in readiness for the connection, at which point a test is performed for absence of light to ensure no crosstalk exists, as provided by a block 198. The first plane mirror is then moved to direct light toward the second plane mirror, and the increase in light is noted at the end of the move, in accord with a block 200. Next, in a block 202, the first and second plane mirrors are adjusted using the hill climbing procedure discussed above until an expected brightness level is obtained. In accord with a block 204, a report is made to the system that the new connection is complete, and the newly free mirrors (i.e., the mirrors that used to correspond with the mirrors used in the new connection) are put into a calibration path, as provided by a block 206, which is accomplished by repeating the foregoing process using the mirrors of the other original connection to define the other signal path.

MOVE EXAMPLE

Figure 10A:
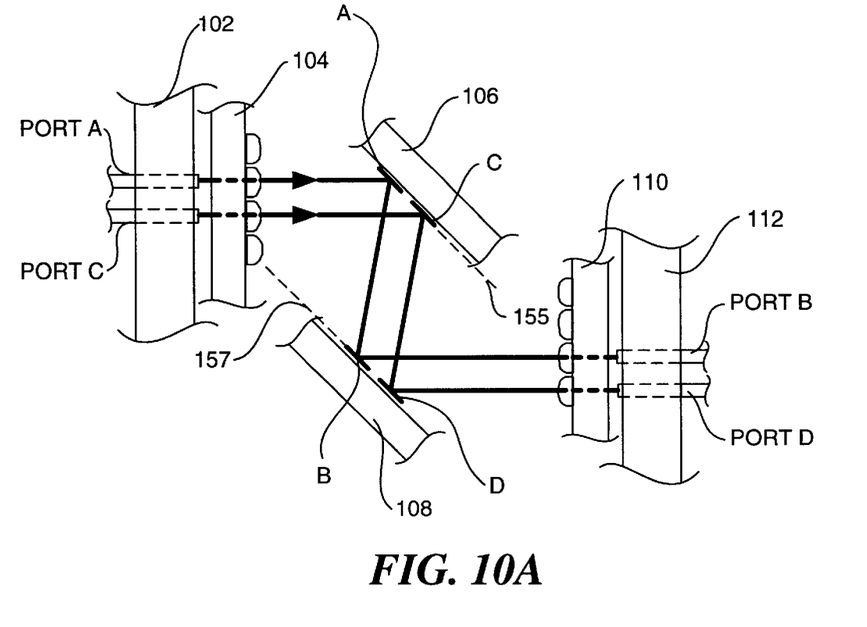
FIGS. 10A and 10B are schematic diagrams illustrating a pair of connection paths before and after the connection paths are swapped.
Figure 10B:
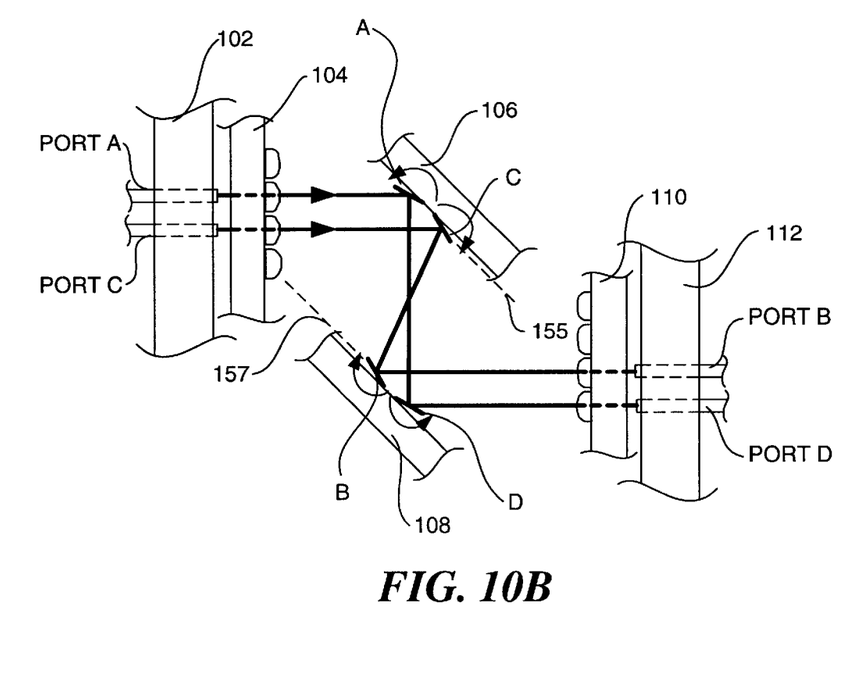

With reference to FIGS. 10A–B, suppose that a new connection is to be made connecting a Port A to a Port D, wherein both Ports A and D are not initially assigned to working conditions. Furthermore, suppose that there exists an initial condition such that Port A is connected to a Port B, and a Port C is connected to Port D, as depicted in FIG. 10A. The following sequence of steps accomplish the task:

1. Start moving ($2^{nd}$ plane) mirror D to point to mirror A. In accord with the illustration of FIG. 10B, this would comprise rotating mirror D counterclockwise.
2. Start moving mirror C to a parking spot, so as to break power going to mirror D.
3. Request working light for mirror A.
4. Wait for illumination on existing connection of first mirror, A–B. Detect, and record power on B's output port.
5. Start moving ($1^{st}$ plane) mirror A to point to mirror D. Make sure that mirror D will be in place before mirror A points to it.
6. On completion of the move of mirror D, check that there is no light visible until the completion of the move of A (cross talk test).
7. Upon completion of move A, check for light in D.
8. If no light:
   a) Initiate a coordinated search pattern in D and A. If this fails . . .
   b) Increase size of search pattern to cover mirror drift for those mirrors. If this fails . . .
   c) Move A to its original position and re-affirm illumination is present.
   d) Return "connection failed", with either:
      Path A, D illumination not seen, or
      A illumination missing.
9. Proceed with a capture routine (a fast hill climbing, with larger spacing than the "focus" routine). First, hill climb with D, then A.
10. Repeat capture till maximum is reached.
11. If power is not sufficient, or capture results are ambiguous, repeat search, for another maximum.
12. Initiate a focus process.
13. Return with power values (loss of power through connection) after the capture.
14. Connect C to B as calibration path, and perform full calibration on B.

There is always a concern that connections can get switched, and that the wrong source can be associated with the correct destination. However, if all mirrors that are not moving are maintained in known connections, they cannot get mixed up with new paths. Two sources cannot point to the same destination.

A single move in a fully-configured optical switch always involves 4 mirrors, since two paths must be broken to create two new paths. These two new paths will not get confused, since there are only two configurations—the old paths (completely calibrated) and the new pair (less well calibrated, but there's nothing else they could connect to).

The connections that are most likely to be switched are those that have both the $1^{st}$ and the $2^{nd}$ plane mirrors close together (within the estimated drift of the mirrors).

For safety, paths should be changed in isolation (i.e., only one path at a time should be switched). The act of completing a path gives confirmation, since the new path will pass light as it is created, offering as much security as a wink. If multiple paths are to be made together, their completion times can be staggered, so that, for each path, light appears at the correct time—at the end of the move.

If a large number of paths must be moved at the same time (a recovery situation, or "massive restoration"), then groups of paths that are not close neighbors can be safely made in parallel. Those paths that are at risk of being switched can be staggered.

Cross-coupling can also be diagnosed with a capture. If two or more are done in parallel, the error may not be seen immediately, but the capture of the first mirror will be inherently unstable, using power outputs from the other second path. If a capture is done separately, then the power output will not change—a sure indication of cross-coupling (or a failure somewhere else in the system).

If a cross-connect is diagnosed, then both paths will be known, and there will be sufficient drift information to swap the mirrors into the correct paths.

One cross-connection is more complex to solve—the $1^{st}$ mirror locks on to an adjacent source lens instead of its own lens. Since a power check is used as soon as a connection has been captured, this will only pass detection if the adjacent lens carries light significantly brighter (perhaps 30 dB). This situation can be checked beforehand. Furthermore, the beam shape of such a misaligned beam will also be significantly different—and thus detectable by the capture routine.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method for maintaining path integrity in an optical switching device that enables selective connection of optical signals received on a plurality of input fibers to respective output fibers to form a plurality of signal paths, said optical switching device including a first array of mirrors substantially disposed in a first mirror plane and a second array of mirrors substantially disposed in a second mirror plane, each signal path comprising light received from an input fiber that is directed toward a mirror in the first mirror plane that is positioned so as to reflect the light toward a respective mirror in the second mirror plane, which in turn is positioned so as to direct the light toward output fiber corresponding to the signal path, thereby connecting the input fiber to the output fiber, the method comprising:

continuously maintaining all mirrors in signal paths through an appropriate positioning of the mirrors corresponding to those signal paths;

setting up only one new signal path at a time by:

moving a mirror in the second mirror plane corresponding to the new signal path into a correct position while controlling the position of other mirrors so as to prevent undesired light from being directed upon said mirror or toward an output fiber corresponding to the new signal path;

providing a light signal to an input fiber corresponding to the new signal path, said light signal being directed toward a mirror in the first mirror plane; and moving the mirror in the first mirror plane corresponding to the signal path to direct light toward the mirror in the second mirror plane; and confirming that the new signal path is properly configured by observing a change in light intensity at the output fiber corresponding to the new signal path.

2. The method of claim 1, further comprising moving a first mirror in the first mirror plane that was previously associated with a signal path that included the mirror in the second mirror plane corresponding to the new signal path so that said first mirror does not direct light toward said mirror in the second mirror plane.

3. The method of claim 1, further comprising adjusting the positions of the mirrors in the first and second mirror planes corresponding to the new signal path to increase the power of the light signal produced at the output fiber corresponding to the new signal path.

4. The method of claim 3, wherein the mirrors in the first and second mirror planes corresponding to the new signal path are enabled to pivot about two substantially orthogonal axes, and wherein increasing the power of the light signal comprises:

moving the mirror in the first mirror plane in a pattern about its respective axes while measuring a power level produced at the output fiber corresponding to the new signal path;

calculating an optimal position about both axes of the mirror in the first mirror plane and moving said mirror to the position that is calculated;

moving the mirror in the second mirror plane in a pattern about its respective axes while measuring a power level produced at the output fiber corresponding to the new signal path; and calculating an optimal position about both axes of the mirror in the third mirror plane and moving said mirror to the position that is calculated.

5. The method of claim 3, further comprising dithering each of the mirrors in the first and second mirror planes corresponding to the new signal path about it's respective axes using decreasing motions while measuring a power level of the light signal produced at the output fiber corresponding to the new signal path to determine the optimal position for said mirrors.

6. The method of claim 3, wherein the mirror in the first mirror plane is associated with an initial signal path, further comprising:

requesting a light signal to be provided as an input signal for the initial signal path;

measuring an initial light signal power level produced at an output fiber corresponding to the initial signal path; and comparing the initial light signal power level to a light signal power level produced at the output fiber corresponding to the new signal path to verify the mirrors in the first and second mirror planes corresponding to the new signal path are properly configured.

7. The method of claim 1, wherein undesired light is prevented from being directed toward the output fiber corresponding to the new signal path by maintaining the position of mirrors in proximity to the mirrors being moved while the mirrors are being moved.

8. The method of claim 1, wherein light signal is provided by a working signal connected to the input fiber corresponding to the new signal path.

9. The method of claim 1, wherein light signal is provided by a test signal connected to the input fiber corresponding to the new signal path.

10. A method for configuring a signal path in an optical switching device that enables selective connection of optical signals received on a plurality of input fibers to respective output fibers, said optical switching device including a first array of mirrors substantially disposed in a first mirror plane and a second array of mirrors substantially disposed in a second mirror plane, the new signal path connecting a selected input fiber to a selected output fiber, the method comprising:

moving a first mirror in the second mirror plane into a correct position for the new path;

moving a second mirror in the first mirror plane that was previously reflecting light toward the first mirror to a position such that the second mirror does not reflect light toward the first mirror;

moving a third mirror in the first mirror plane so as to direct light received from said selected input fiber toward the first mirror, whereupon said light is directed from the first mirror toward the selected output fiber thereby forming a connection path between said selected input and output fibers; and adjusting the positions of the first and third mirrors to increase a power of a light signal produced at the selected output fiber.

11. The method of claim 10, wherein the first and third mirrors are enabled to pivot about two substantially orthogonal axes, and wherein increasing the power of the light signal at the selected output fiber comprises:

moving the first mirror in a pattern about its respective axes while measuring a power level produced at the selected output fiber;

calculating an optimal position about both axes of the first mirror and moving the first mirror to the position that is calculated;

moving the third mirror in a pattern about its respective axes while measuring a power level produced at the selected output fiber; and calculating an optimal position about both axes of the third mirror and moving the third mirror to the position that is calculated.

12. The method of claim 10, further comprising dithering each of the first and third mirrors about it's respective axes using decreasing motions while measuring the power level produced at the selected output fiber to determine the optimal position for said first and third mirrors.

13. The method of claim 10, wherein the third mirror is associated with an initial signal path, further comprising:
   requesting a light signal to be provided as an input signal for the initial signal path;
   measuring an initial light signal power level produced at an output fiber corresponding to the initial signal path; and
   comparing the initial signal power level to a light signal power level produced at the selected output fiber to verify the first and third mirrors are properly configured.

14. The method of claim 13, wherein the light signal that is requested comprises a test light signal.

15. The method of claim 10, further comprising:
   verifying that the first mirror does not receive light reflected from the second mirror after the second mirror is removed.

16. A method for configuring a signal path in an optical switching device that enables selective connection of optical signals received on a plurality of input fibers to respective output fibers, said optical switching device including a first array of mirrors substantially disposed in a first mirror plane and a second array of mirrors substantially disposed in a second mirror plane, the new signal path connecting a selected input fiber to a selected output fiber, the method comprising:
   moving a first mirror in the second mirror plane into a correct position for the new path;
   moving a second mirror in the first mirror plane that was previously reflecting light toward the first mirror to a position such that the second mirror does not reflect light toward the first mirror;
   moving a third mirror in the first mirror plane so as to direct light received from said selected input fiber toward the first mirror, whereupon said light is directed from the first mirror toward the selected output fiber thereby forming a connection path between said selected input and output fibers;
   moving at least one of the first and third mirrors to a new position; and
   verifying that the selected input fiber is connected to the selected output fiber by observing a change in a signal power level produced at the selected output fiber due to movement of said at least one of the first and third mirrors.

17. A method for configuring a signal path in an optical switching device that enables selective connection of optical signals received on a plurality of input fibers to respective output fibers, said optical switching device including a first array of mirrors substantially disposed in a first mirror plane and a second array of mirrors substantially disposed in a second mirror plane, the new signal path connecting a selected input fiber to a selected output fiber, the method comprising:
   moving a first mirror in the second mirror plane into a correct position for the new path;
   moving a second mirror in the first mirror plane that was previously reflecting light toward the first mirror to a position such that the second mirror does not reflect light toward the first mirror;
   moving a third mirror in the first mirror plane so as to direct light received from said selected input fiber toward the first mirror, whereupon said light is directed from the first mirror toward the selected output fiber thereby forming a connection path between said selected input and output fibers; and
   verifying that the selected input fiber is connected to the selected output fiber by switching an input signal at the selected input fiber from off to on and observing that an output signal is produced at the selected output fiber at substantially the same instant the signal is switched on.

18. A method of switching first and second signal paths in a optical switching device including a first array of mirrors substantially disposed in a first mirror plane and a second array of mirrors substantially disposed in a second mirror plane, said first signal path initially connecting a first input fiber to a first output fiber through a first mirror in the first mirror plane and a second mirror in the second mirror plane, said second signal path initially connecting a second input fiber to a second output fiber through a third mirror in the first mirror plane and a fourth mirror in the second mirror plane, the method comprising:
   moving the fourth mirror to a correct position corresponding to a first switched signal path that is to connect the first input fiber to the second output fiber;
   moving the first mirror to direct light toward the fourth mirror so as to produce a signal at the second output fiber;
   verifying that the first switched signal path connects the first input fiber to the second output fiber;
   moving the third mirror to a correct position corresponding to a second switched signal path that is to connect the second input fiber to the first output fiber;
   moving the second mirror to direct light toward the third mirror so as to produce a signal at the first output fiber; and
   verifying that the second switched signal path connects the second input fiber to the first output fiber.

19. The method of claim 18, further comprising:
   requesting a light signal on the first input fiber; and
   verifying that the first signal path connects the first input fiber to the first output fiber by observing that a signal is produced at the first output fiber in accordance with the light signal that is requested.

20. The method of claim 19, further comprising verifying that the light signal that is requested does not direct light toward the fourth mirror.

21. The method of claim 19, wherein the light signal that is requested comprises a test light signal.

22. The method of claim 19, wherein the light signal that is requested comprises a working signal.

23. The method of claim 18, further comprising adjusting the positions of the first and fourth mirrors to increase the power of a light signal produced at the second output fiber.

24. The method of claim 23, wherein the first and fourth mirrors may be pivoted about two substantially orthogonal axes, and wherein increasing the power of the light signal produced at the second output fiber comprises:
   moving the first mirror in a pattern about its respective axes while measuring a power level of the light signal produced at the second output fiber;
   calculating an optimal position about both axes of the first mirror and moving the first mirror to the position that is calculated;

moving the fourth mirror in a pattern about its respective axes while measuring a power level of the light signal produced at the second output fiber; and calculating an optimal position about both axes of the fourth mirror and moving the fourth mirror to the position that is calculated.

25. The method of claim 24, further comprising dithering each of the first and fourth mirrors about it's respective axes using decreasing motions while measuring the power level of the light signal produced at the second output fiber to determine the optimal position for said first and fourth mirrors.

26. The method of claim 18, further comprising adjusting the positions of the second and third mirrors to increase the power of the light signal produced at the first output fiber.

27. The method of claim 26, wherein each of the second and third mirrors may be pivoted about two substantially orthogonal axes, and wherein increasing the power of the light signal produced at the second output fiber comprises:

moving the second mirror in a pattern about its respective axes while measuring a power level of the light signal produced at the first output fiber;

calculating an optimal position about both axes of the second mirror and moving the second mirror to the position that is calculated;

moving the third mirror in a pattern about its respective axes while measuring a power level of the light signal produced at the first output fiber; and calculating an optimal position about both axes of the third mirror and moving the third mirror to the position that is calculated.

28. The method of claim 27, further comprising dithering each of the second and third mirrors about it's respective axes using decreasing motions while measuring the power level produced at the first output fiber to determine the optimal position for said second and third mirrors.

* * * * *